United States Patent [19]

Tanaka

[11] Patent Number: 5,486,877
[45] Date of Patent: Jan. 23, 1996

[54] AUDIO VISUAL SYSTEM WITH AUTOMATIC CLOSING OF A BUS CIRCUIT WHEN AN AV UNIT IS DISCONNECTED

[75] Inventor: Shigeo Tanaka, Tokyo, Japan

[73] Assignee: Sony Corporation, Tokyo, Japan

[21] Appl. No.: 317,870

[22] Filed: Oct. 4, 1994

[30] Foreign Application Priority Data

Oct. 8, 1993 [JP] Japan ................................. 5-252679

[51] Int. Cl.$^6$ ............................................... H04N 5/222
[52] U.S. Cl. ........................................ 348/722; 348/705
[58] Field of Search ............................ 348/722, 705, 348/706, 571; H04N 5/222

[56] References Cited

U.S. PATENT DOCUMENTS

| | | | |
|---|---|---|---|
| 4,689,683 | 8/1987 | Efron | 348/722 |
| 4,991,019 | 2/1991 | Enami et al. | 348/722 |
| 5,374,994 | 12/1994 | Kimura | 348/722 |

*Primary Examiner*—Victor R. Kostak
*Attorney, Agent, or Firm*—Jay H. Maioli

[57] ABSTRACT

An audio-visual system includes an AV center which may be connected to a plurality of image source components. An AV bus cable is connected respectively between each of the image source components and the AV center. The configuration of the interconnections between the AV center and all components of the system are identical and of simplified layout. Thus, complex interconnective methods and excessive numbers of cable, connectors, etc., are avoided while user convenience and general appearance of the system are greatly enhanced without compromising overall system functionality and/or operational capabilities.

9 Claims, 14 Drawing Sheets

(PRIOR ART)

AUDIO VISUAL SYSTEM WITH AUTOMATIC CLOSING OF A BUS CIRCUIT WHEN AN AV UNIT IS DISCONNECTED

BACKGROUND OF THE INVENTION

1. Field of the Invention

The present invention relates generally to a audio-visual system. Particularly the present invention relates to an audio-visual system including a bus for interconnection of various components thereof.

2. Description of the Related Art

Figure 17:
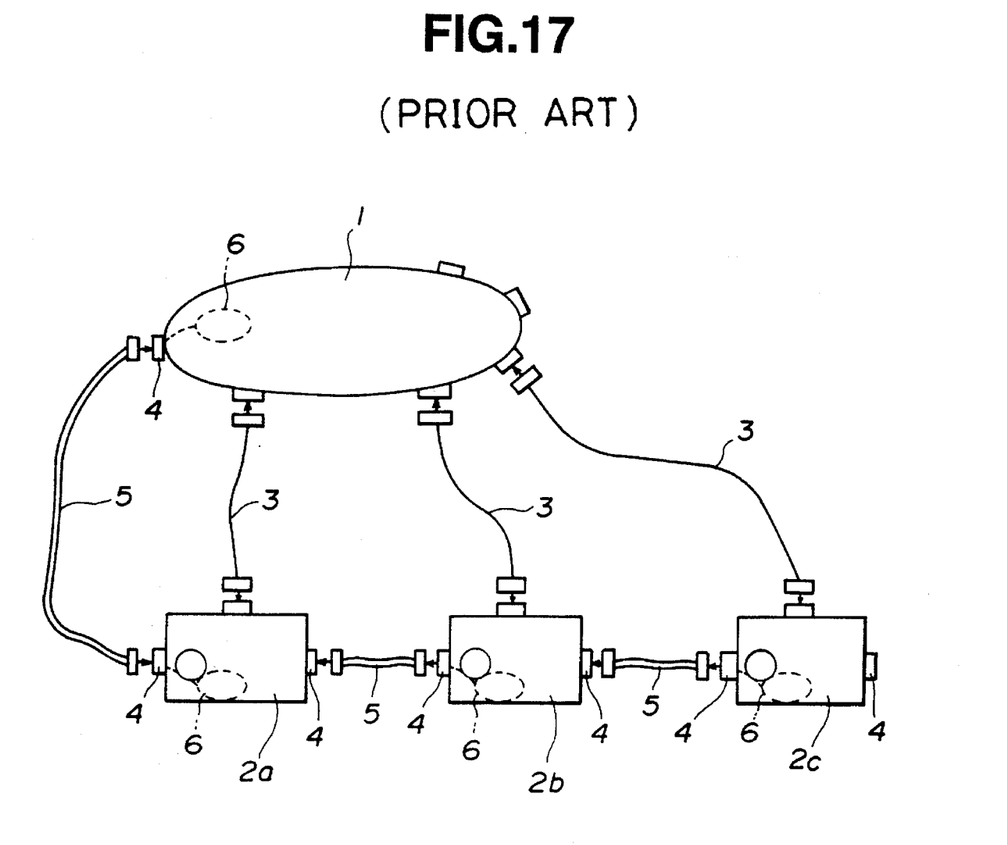
FIG. 17 shows a block diagram of a conventional AV system including signal cable and bus cable interconnections.

Recently, audio-visual (AV) systems have been introduced in which control of various system components may be effected in accordance with operating instructions sent to an audio-visual center. FIG. 17 shows an example of such an conventional AV system with connecting bus.

In FIG. 17 an AV center 1 (such as a television monitior, or the like) is connected to a plurality of image sources 2a, 2b and 2c, which may, for example, include a video tape deck, a tuner, satellite decoder, etc. The AV center 1 is connected individually to each of the image sources 2a, 2b, 2c, respectively, via signal cables 3 which generally include an video signal cable and an audio signal cable (left and right audio cables may be provided for stereo audio). In addition, the AV center 1 is connected in series to the image sources 2a–2c via bus cables 5 interconnected via connectors 4. The bus cables generally include a − balance cable, + balance cable and ground cable. It will be noted that each of the image sources are provided with two connectors 4 for allowing series connection of the components and that a first (i.e. input) side connector 4, as well as the connector 4 of the AV center 1 are provided with end resistance means 6. The end resistance means 6 of the image sources 2a–2e are designed so as to be defeated in the case wherein bus cables are connected to both input and output sides of the component (2a–2c), and the end resistance 6 of the AV center 1 is defeated according to the presence of a bus cable (output) being connected thereto. Thus, according to the system of FIG. 17, the end resistance means 6 of the AV center 1 as well as of the image sources 2a and 2b are inactive due to the presence of the bus cables 5, while the end resistance 6 of the image source 2c is active, since no bus cable 5 is connected to the output side thereof.

According to the system as described above, sufficient control of the AV system is possible. However, recently, since such sophisticated bus systems are becoming increasingly part of ordinary AV products, there is a desire to simplify interconnection arrangements for AV components in order to allow the average consumer to utilize such products with a minimum of confusion.

For example, in the system described above, there is an obvious one to one correspondence between the signal cables 3, the AV center 1, and each of the image source components 2a, 2b and 2c. However, with respect to the series connection of the bus cables 5, such one to one correspondence is not readily evident and misinstallation may easily occur when such connections are effected by a non-professional, since the way in which the signal cables are connected is not analagous to the manner in which the bus cables 5 are connnected. Thus, there is a tendency, for example, for a user to connect a bus cable to the output side of the final component in the system (i.e. 2c) rendering the end resistance means 6 of the system inoperative, leading to malfunction of the bus system overall.

Thus it is desirable to provide an AV system including bus functions, in which the connection between each respective component and the AV center 1 is the same for all components. Thus, confusion between signal cable interconnection and bus system interconnection may be avoided and ease of use for the consumer is greatly enhanced, while sophisticated functioning of the AV system overall need not be compromised.

SUMMARY OF THE INVENTION

It is therefore a principal object of the present invention to overcome the drawbacks of the related art.

It is a further object of the present invention to provide an AV system including a bus function in which interconnection of system components is simplified. In addition, a number of cables, connectors etc., necessary for system operation may be substantially reduced, thus lowering costs.

In order to accomplish the aforementioned and other objects, a AV system is provided as described below.

DESCRIPTION OF THE PREFERRED EMBODIMENT

Referring now to the drawings, particularly to FIGS. 1–7, a first preferred embodiment of an AV system 1 according to the invention will be described hereinbelow in detail.

Figure 1:
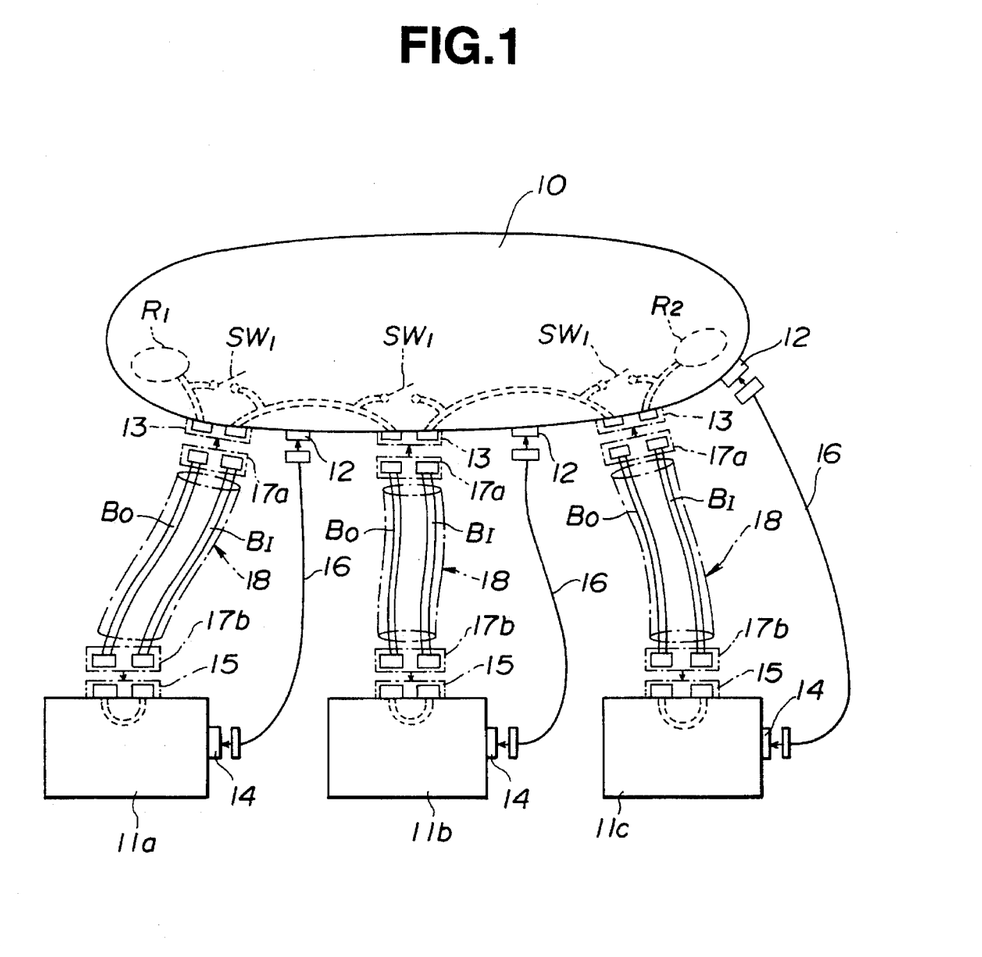
FIG. 1 is a block diagram of a first embodiment of an audio-visual system utilizing AV bus cables according to the invention.

According to the first embodiment, an AV control center 10, which may be a television set, video monitor, or the like, is connected to a plurality of image source components 11a, 11b, 11c via a first AV signal connector 12 and a second AV bus connector 13.

The image source components 11a, 11b and 11c respectively include corresponding connectors, that is, an AV signal connector 14 for output of an image signal input to the AV signal connector 13 of the AV control center 10 via an AV signal cable 16, and an AV bus connector 15 for connection to the AV bus connector 13 of the AV control center 10 via an AV bus cable. Thus, according to this arrangement a 1:1 correspondence is established in cable connections between the AV control center 10 and any of the image source components 11a, 11b and 11c. That is, each image source component 11 requires an AV bus cable 18 and an AV signal cable 16 between itself and the AV control center 10.

Figure 2:
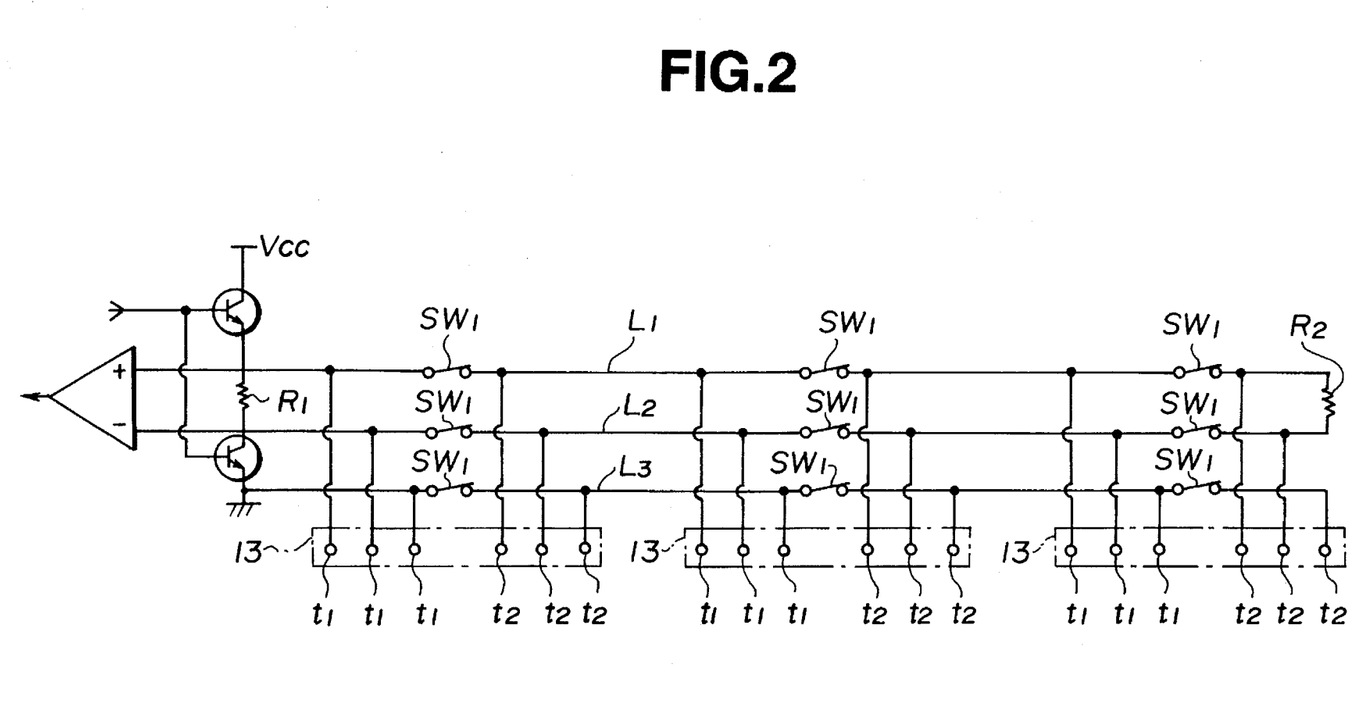
FIG. 2 is a circuit diagram of the bus connection system within the audio-visual system of FIG. 1.
Figure 3:
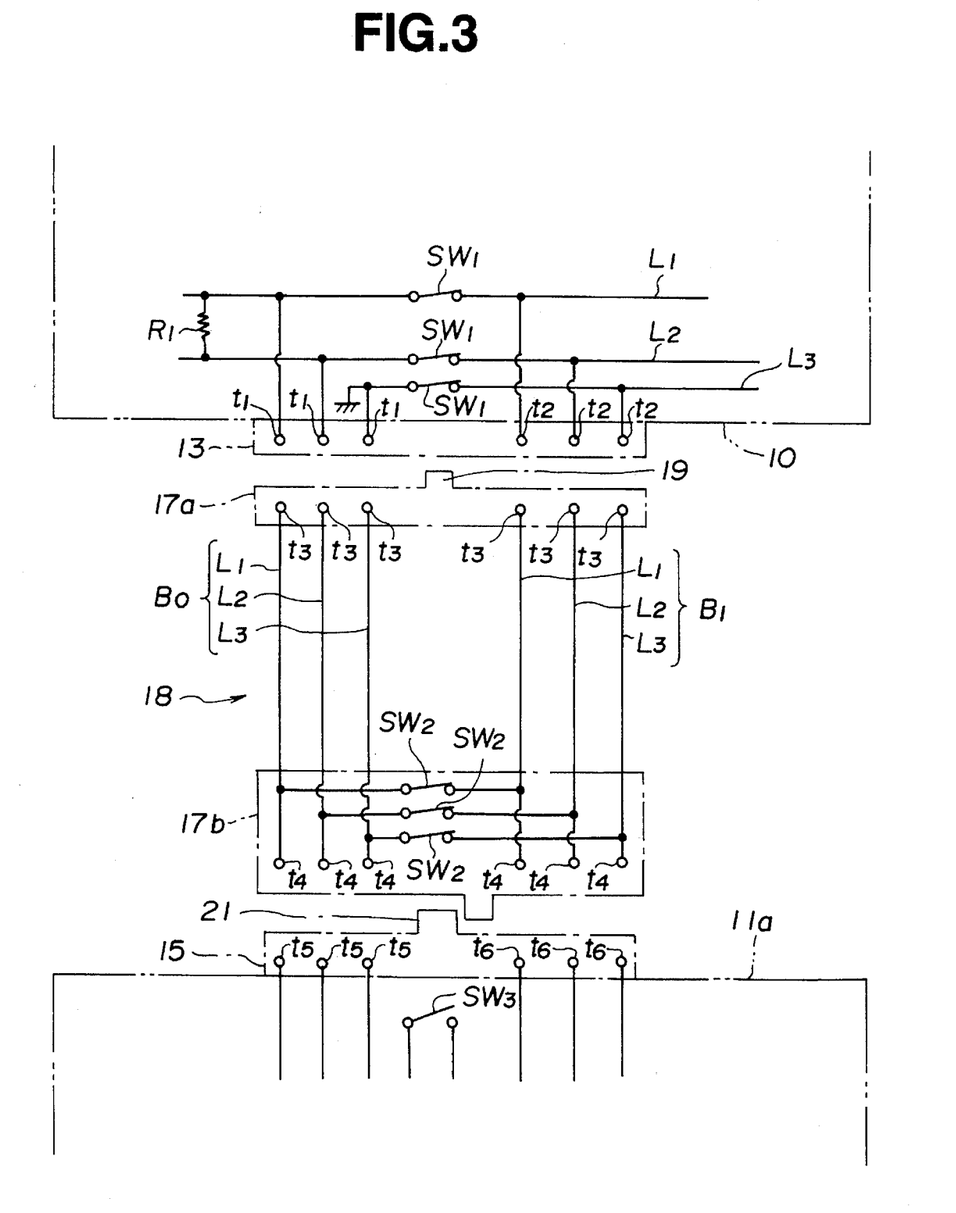
FIG. 3 is a schematic representation of bus connection between an AV center and an image source via a AV bus cable according to the invention.

Referring now to FIGS. 2 and 3, a circuit diagram of bus connection within the AV control center 10 is shown. As may be seen, the AV bus comprises a positive (+) balance line L1, a negative (−) balance line L2 and a ground line L3, the lines L1 and L2 are connected at first and second ends of the bus circuit by first and second resistors R1 and R2.

In addition, the AV bus of the AV control center 10 includes a plurality of switch groups t extracted from the AV bus lines L1, L2, L3 at each of the AV bus connectors 13 thereof, Each switch group includes an output terminal group t1 (t1, t1, t1) and an input terminal group t2 (t2, t2, t2) which comprise the terminal portions of each of the connectors 13.

The input terminal group t2 and the output terminal group t1 as well as the AV bus lines L1, L2 and L3 are interconnected via a switch group SW1. The switch group SW1 is operable to adopt a closed, or ON, state according to connection of a first plug 17a (FIG. 3) of the AV bus cable 18 to the connector 13 of the AV control center 10 and to adopt an open, or OFF, state according to disconnection of a first plug 17a from one of the connectors 13.

FIG. 3 shows a detailed circuit diagram of the interconnection between a connector 13 of the AV control center 10, a first plug 17a, its AV bus cable 18 and a corresponding second plug 17b and the connector 15 of an image source component 11 to be connected to the AV system 1.

The AV bus cable 18 comprises an output side bus line B0 and an input side bus line B1 each including a + balance line L1, a − balance line L2 and a ground line L3, similarly to the internal AV bus of the AV control center 10. In addition, first ends of each of the bus lines B0 and B1 are connected to a switch group t3 of the first plug 17a, while second ends of the bus lines B0 and B1 are connected to a switch group t4 of the second plug 17b of the AV bus cable 18.

The second plug 17b further includes a switch group SW2 operable between the AV bus lines L1, L2, L3 of the output side bus line B0 and the AV bus lines (L1–L3) of the input side bus line B1 in a manner analagous to the switch group SW1 of the internal AV bus of the AV control center 10. That is, the switch group SW2 is opened (switches assume an OFF, or open state) according to attachment of the second plug 17b to a connector 15 of an image source component 11 and closed (switches assume an ON, or closed state) according to disconnection of the second plug 17b from the connector 15.

The connector 15 includes an input terminal group t5, an output terminal group t6, a detecting switch SW3, and a projecting member 21. Upon connection of the second plug 17b to the connector 15 of the image source component 11, the following occurs.

Figure 4:
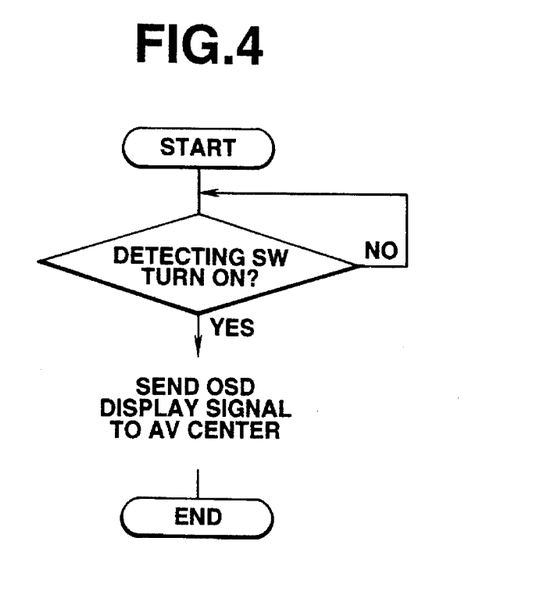
FIG. 4 is a flow chart of an OSD display processing method of the system of the invention.

When the second plug 17b is connected to the connector 15, the projecting member 21 is active to turn OFF the switch group SW2. Further, according to such connection, the detecting switch SW3 is closed (ON). When the detecting switch SW3 becomes ON a microcomputer (not shown) of the image source component 11 becomes active to output an on-screen display (OSD) image to the CRT (not shown) of the AV control center 10 for displaying a present connective state of the AV system 1, as shown in the flowchart of FIG. 4.

Figure 5:
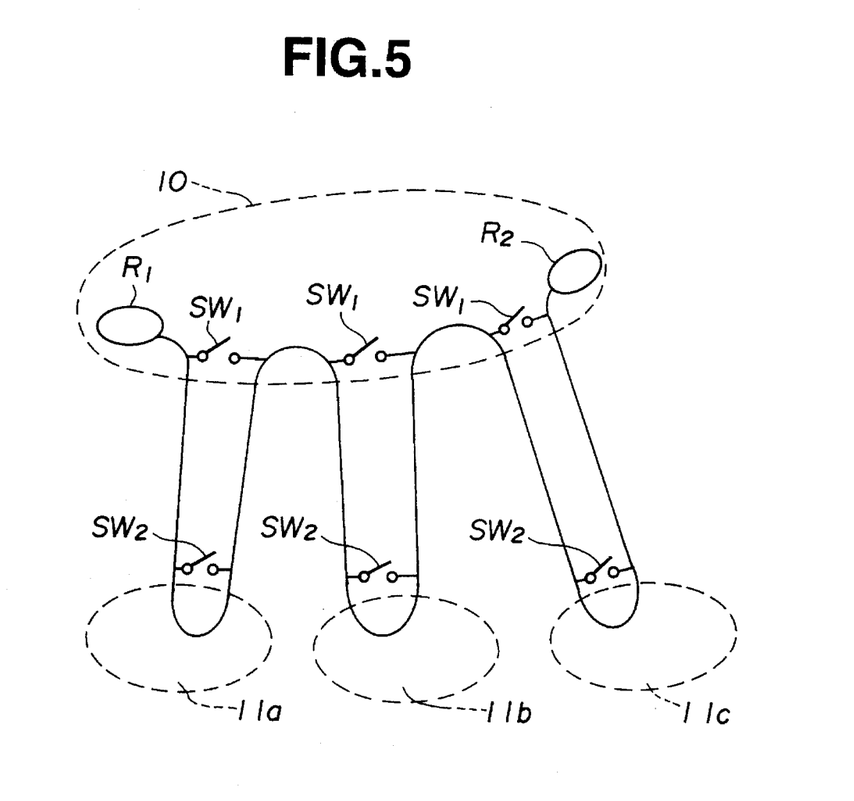
FIG. 5 is a schematic view of a first state of the AV bus of the first embodiment.

Thus, following connection of all image source components 11a, 11b and 11c, the state of the switch group SW1 becomes OFF, while the state of the switch group SW2 the AV bus cable 18 also becomes of OFF to produce the connective state of the AV system 1 as shown in FIG. 5.

Figure 6:
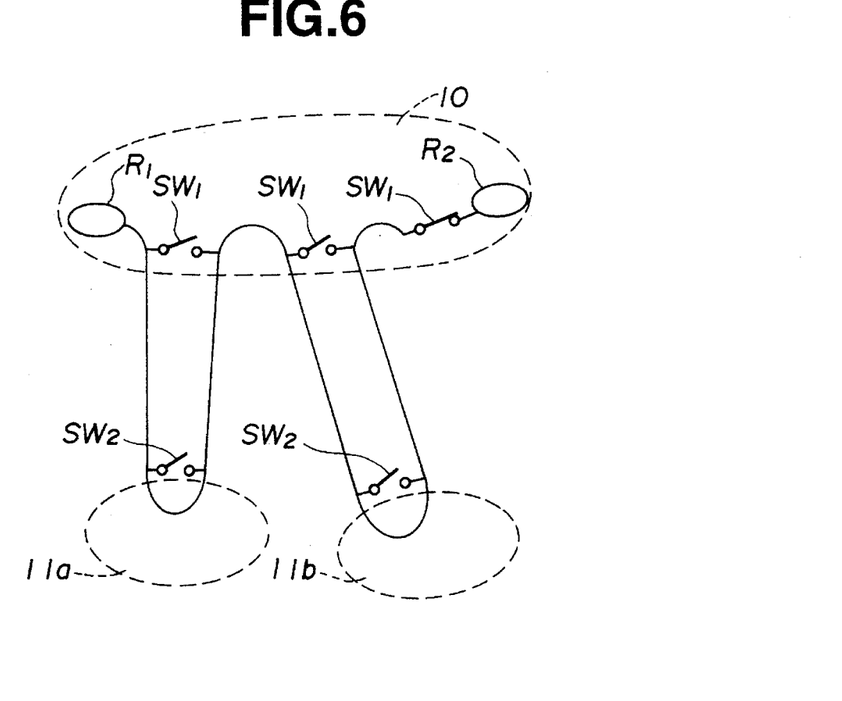
FIG. 6 is a schematic view of the AV bus of FIG. 5 in an alternative second state thereof.

FIG. 6 shows a connective state of the AV system 1 if the third image source component 11c is disconnected from the system. As may be seen, when only two image source components 11 are utilized, the state of the switch group SW1 of the third connector 13 remains closed (ON) while the switch groups SW1 of the first and second connectors 13 are open (OFF) since they are connected to the image source components 11a and 11b. Thus the resistor R2 of the internal AV bus of the AV control center 10 is active to provide the end resistance for the overall AV bus of the AV system 1.

Figure 7:
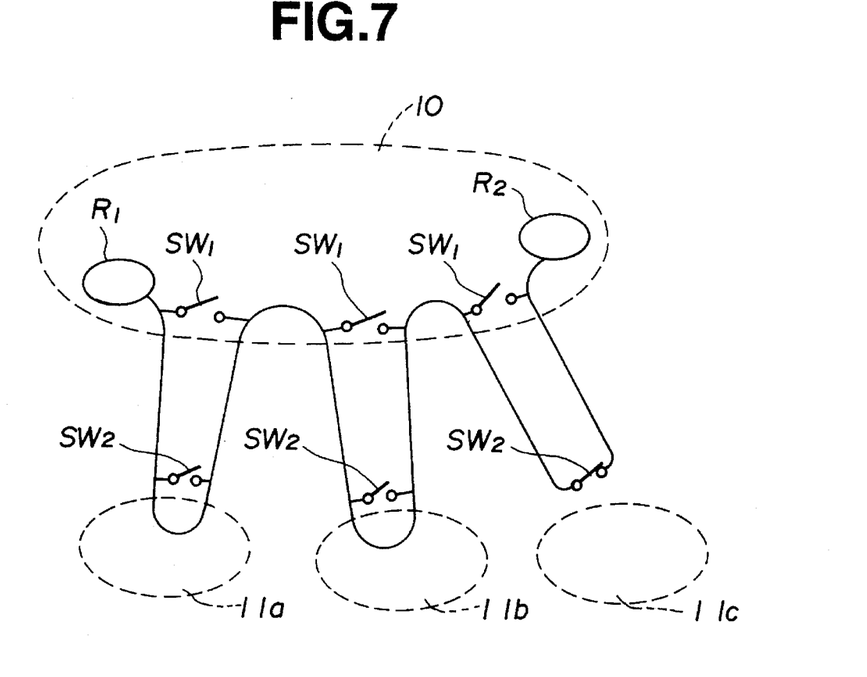
FIG. 7 is a block diagram of a second embodiment of an audio-visual system according to the invention.

If, due to misconnection or malfunction a AV bus cable 18 is connected to the third connector 13 of the AV control center 10 while in fact the second plug 17b of the AV bus cable 18 is not connected to the third image source component 11c, as shown in FIG. 7, the switch group SW1 of the third connector 13 of the AV control center 10 will be caused to remain open. However, as a result, the switch group SW2 of the AV bus cable 18 will remain closed due to non-connection to the image source component 11c, thus forming a loop back to the AV control center 10, again allowing the resistor R2 of the internal AV bus of the AV control center 10 to provide the end resistance for the overall AV bus of the AV system 1. Therefore, normal operation may be carried out and no malfunction will result.

It will be noted that, according to the above-described construction, it is not necessary to provide end resistance means at each image source component, thus reducing the cost and complexity of such components.

While the above-described embodiment provides a AV control center 10 with three connectors 13 for utilizing three image source components 11a, 11b and 11c, it will be noted that, according to the invention, any number of connectors 13 may be provided.

Figure 8:
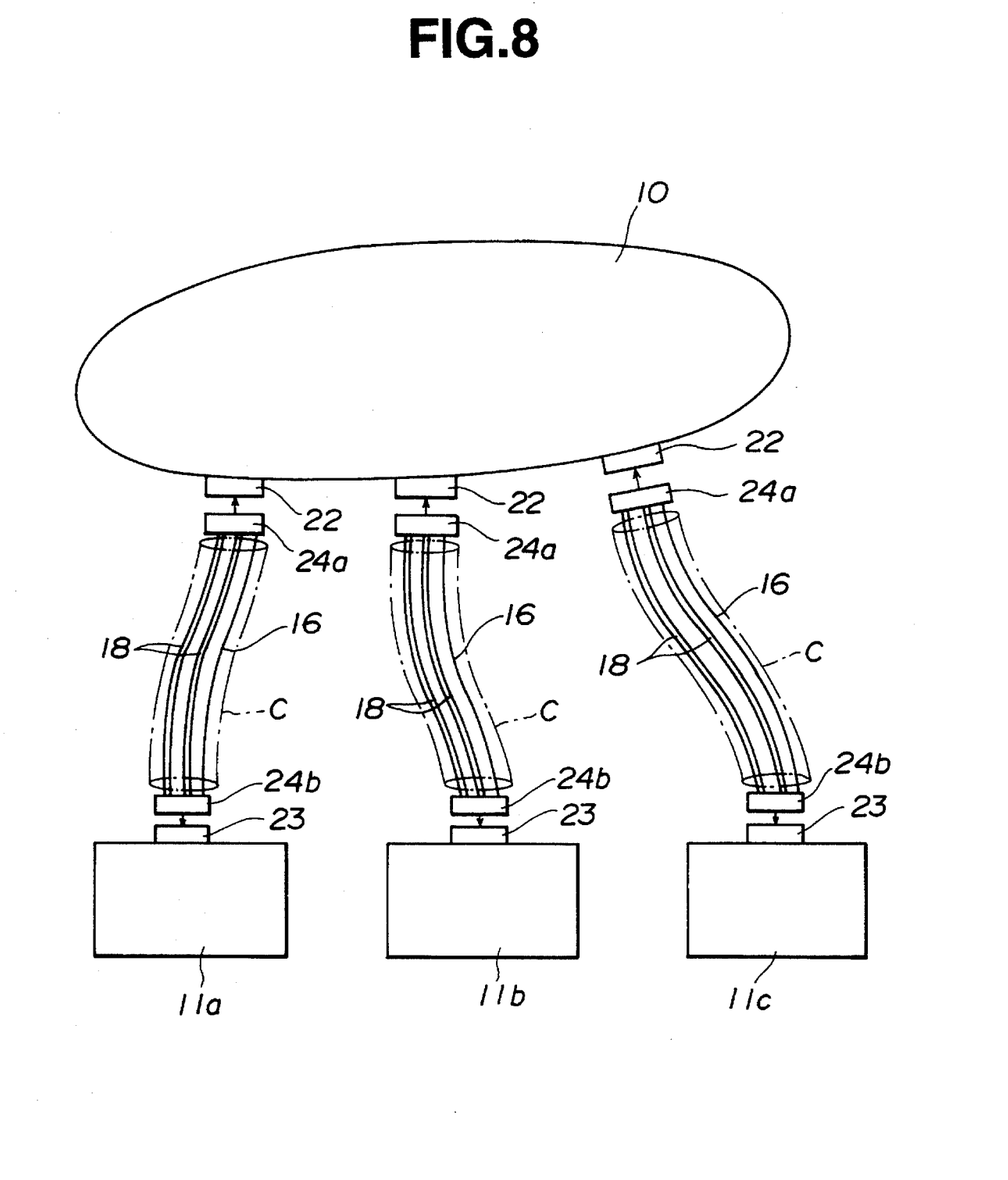
FIG. 8 is a block diagram of a second embodiment of an AV bus cable connection according to the invention.

A second embodiment of an AV system 1 according to the invention will be described in detail with reference to FIG. 8. It will be noted that where the arrangement of subsequently described embodiments disclosed herein correspond to that of the above described embodiment, redundant description will be omitted for brevity.

Basically, the second embodiment provides for the AV bus cable 18 and the AV signal cable 16 to be combined in a single unitary cable C. Connectors 22, 22, . . . of the AV control center 10 are suitable adapted to include terminals for the AV signal as are the connectors 23, 23, . . . of the image source components 11a, 11b 11c, etc. Of course, the first and second plugs 24a and 24b of the unitary cable C are also adapted for transmission of the additional AV signal. In other respects, the second embodiment is identical to the above-described embodiment.

However, according to the second embodiment, wiring is further simplified and overall neatness of the system when fully connected is enhanced.

Figure 9:
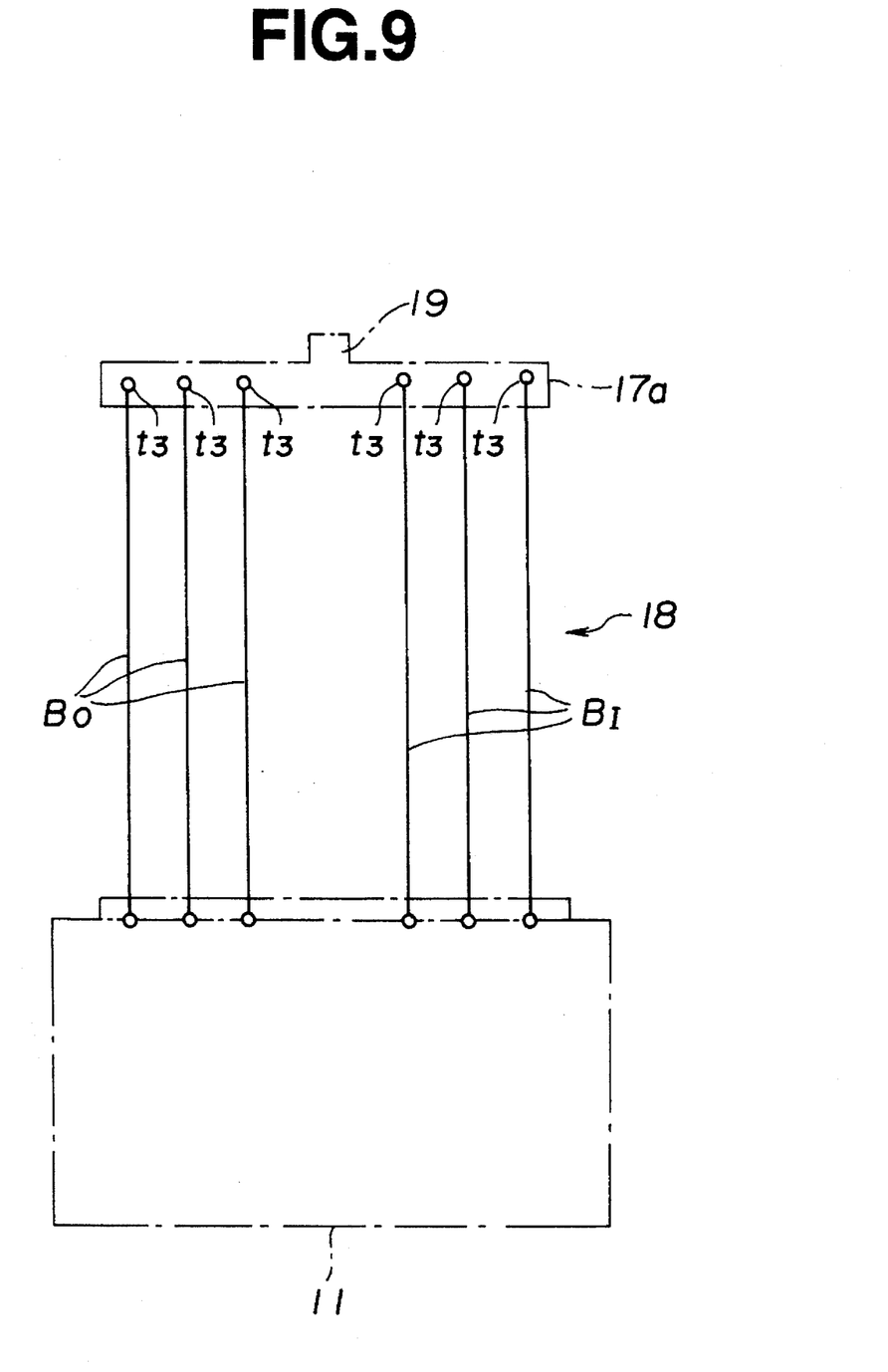
FIG. 9 is an modification of a connection between an AV center and an image source according to the invention.

FIG. 9 shows a third embodiment of the AV system 1 of the invention. This embodiment basically comprises a modification of the connection between the image source components 11a, 11b, 11c and the AV bus cable 18. According to this modification, the AV bus cable 18 is permanently and non-releasably attached to the image source component 11. Thus, no switch group SW2 need be provided for loop back, since the AV bus cable 18 is integral to the image source component 11. As a result, cost and complexity may be further reduced with no compromise of functionality.

Figure 10:
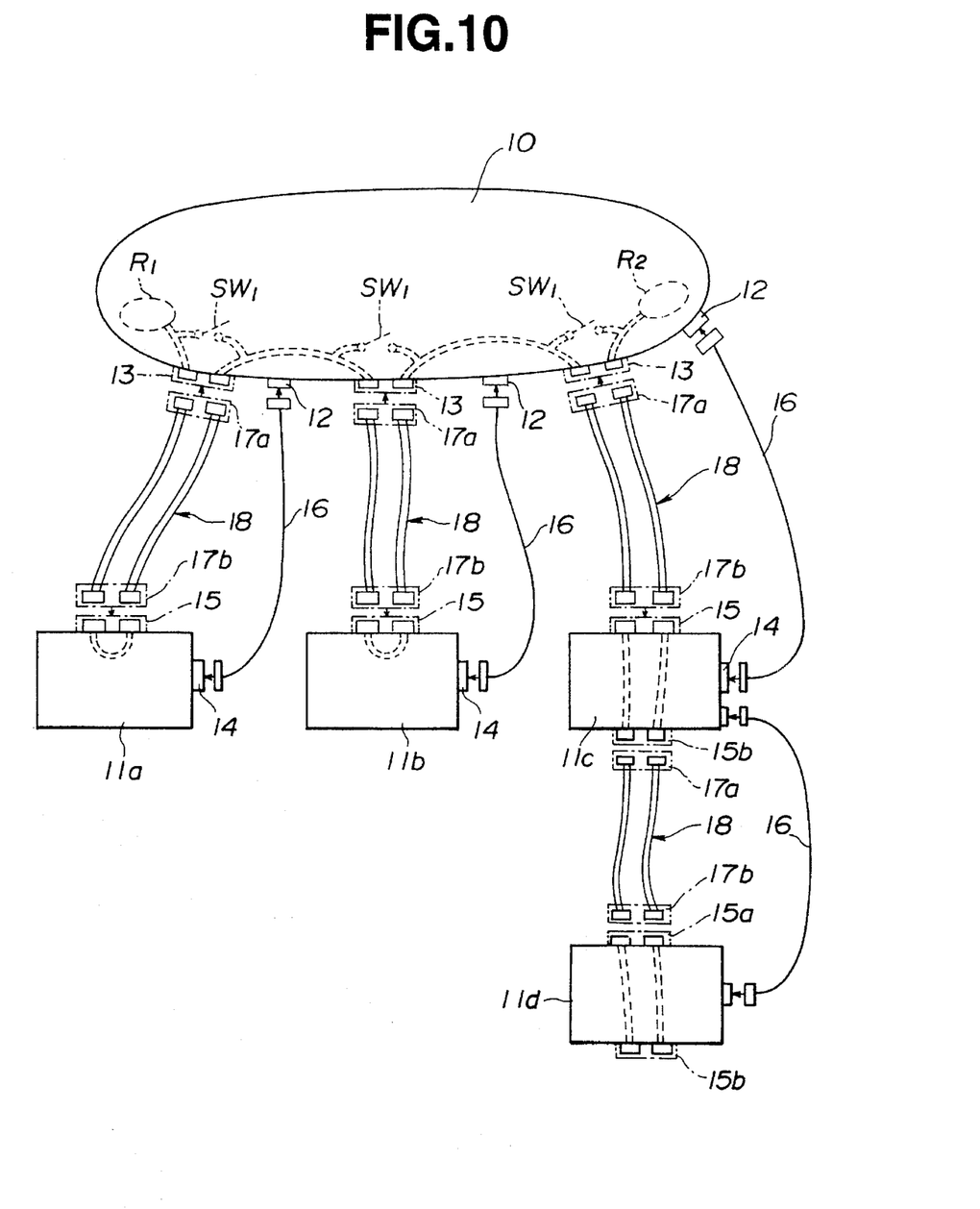
FIG. 10 is a block diagram of a third embodiment of an AV bus cable connection according to the invention.
Figure 11:
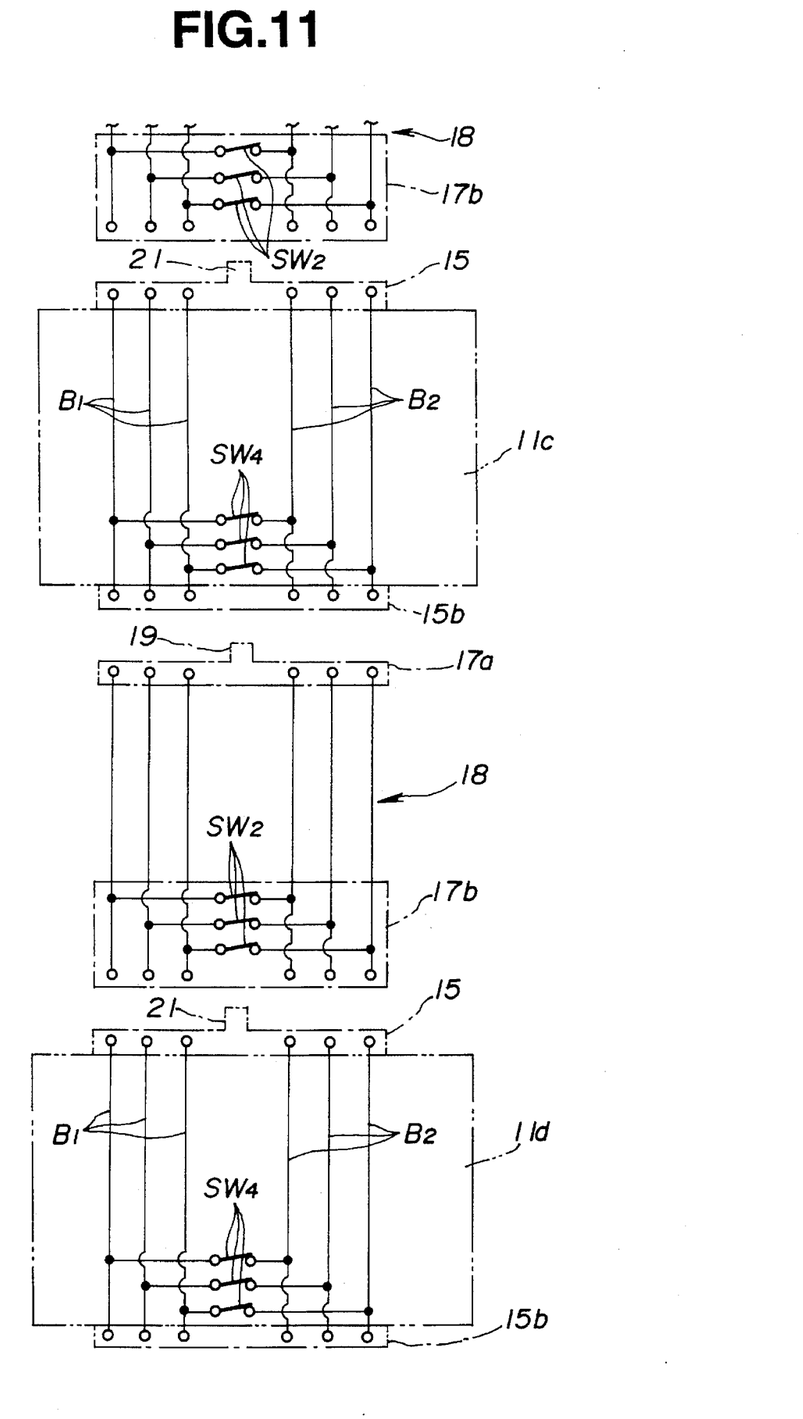
FIG. 11 is a schematic diagram of a connection between a master component and slave component in relation to the AV system of the invention.
Figure 12:
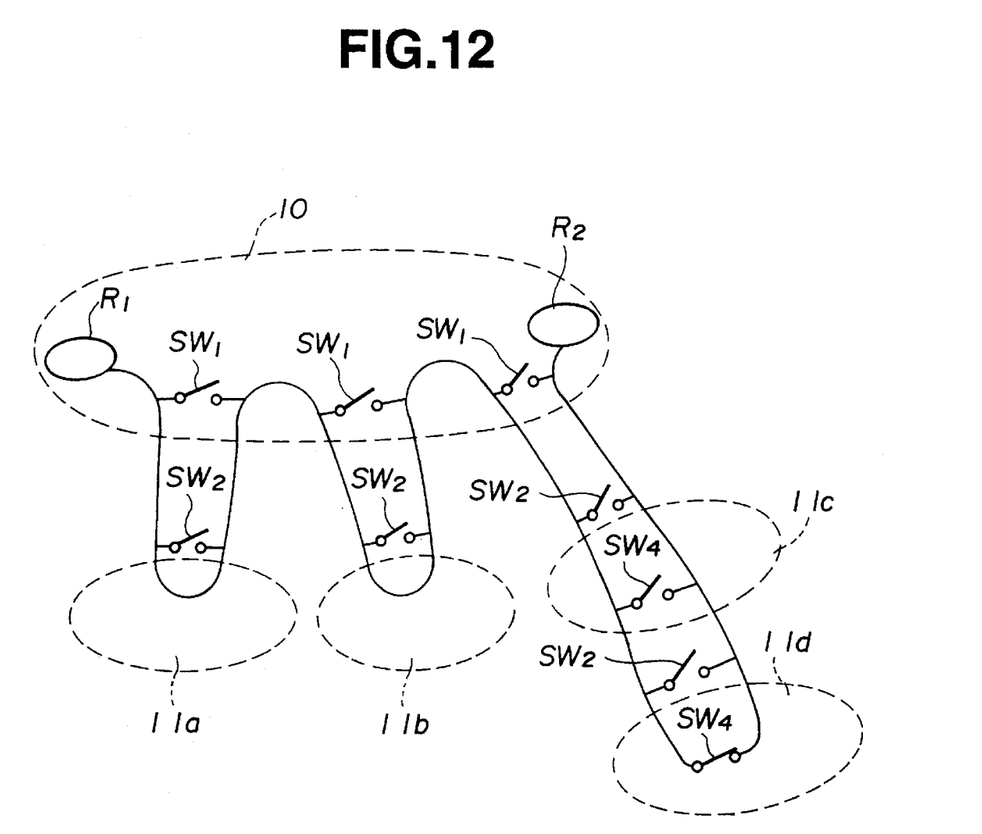
FIG. 12 is a block diagram of a fourth embodiment of an AV bus cable connection according to the invention.

FIGS. 10, 11, and 12 show a fourth embodiment of the AV system 1 according to the invention; the same reference numerals used in describing the first embodiment will again be utilized for simplicity of explanation.

As may be seen, the third image source component 11c is utilized as a master component connected via an additional AV bus cable 18 to a slave component, that is, a fourth image source component 11d. According to this embodiment, as seen in FIG. 11, the image source component 11 is provided with a connector 15 to be connected to the AV control center 10 and a slave connector 15b for allowing connection of an additional image source component 11d. The use of the third image source component 11c as a master component for the fourth image source component 11d is also shown in FIG. 12.

For facilitating such a system, bus lines B2 and B3 are provided between the connectors 15 and 15a of the image source component. These bus lines B2 and B3 are interconnected by a switch group SW4 which is switched according to a projecting portion 19 of the first plug 17a of the AV bus cable 18, the AV signal may be connected via a standard video in/out connectors and cables (i.e. AV cable 16) or may be integrated similar to the second embodiment.

Figure 13:
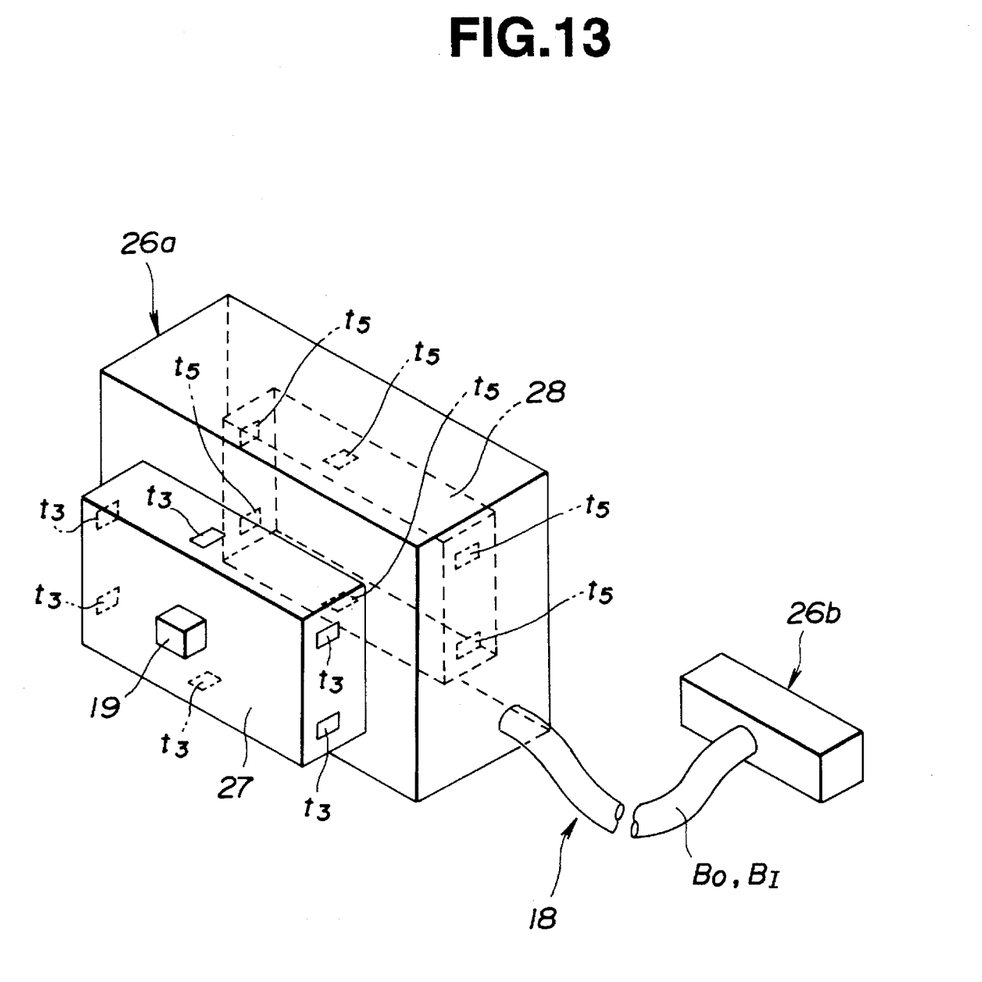
FIG. 13 is a perspective view of an AV bus cable of a fifth embodiment.
Figure 14:
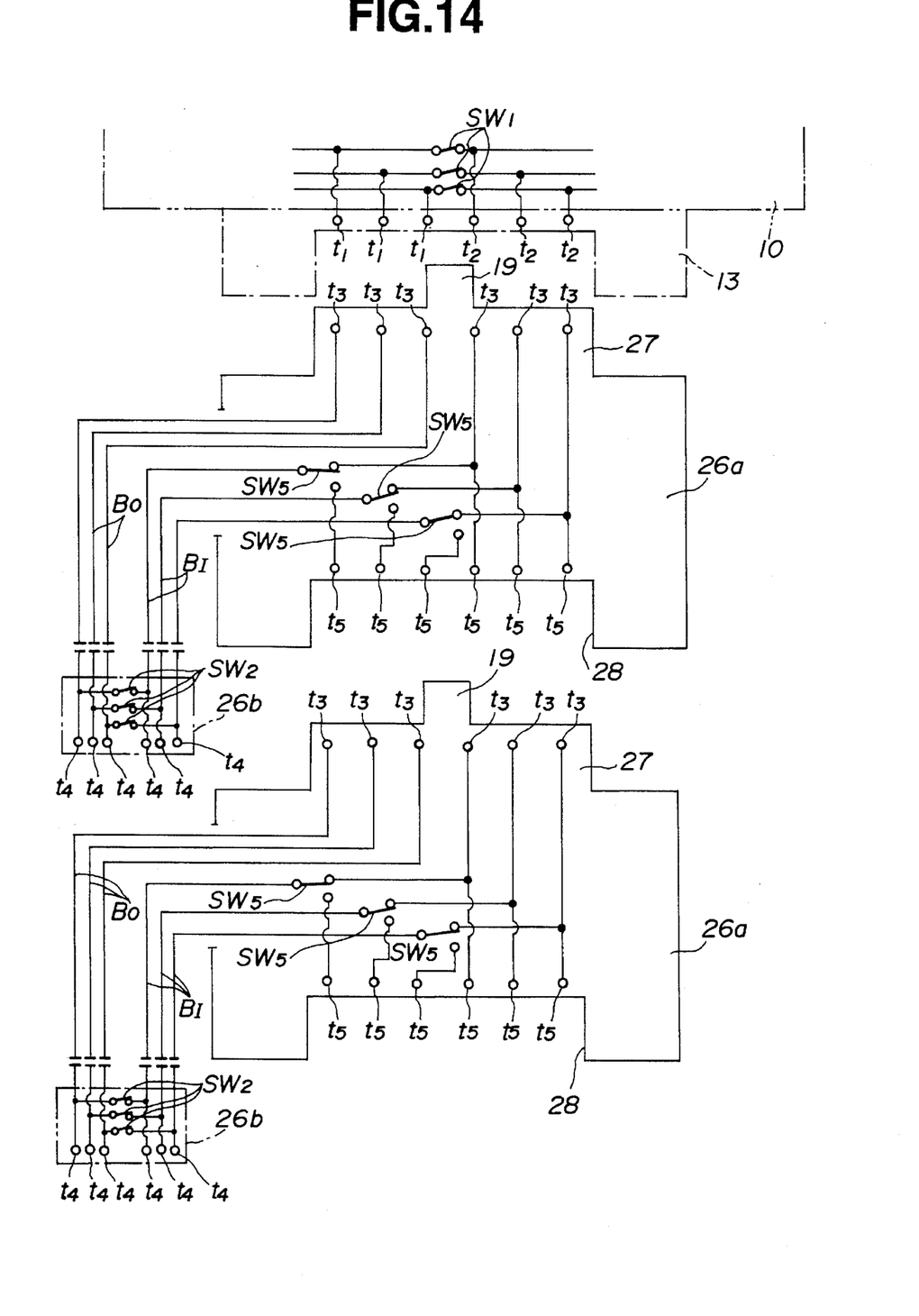
FIG. 14 is a circuit diagram of connection of the bus system of the fifth embodiment.
Figure 15:
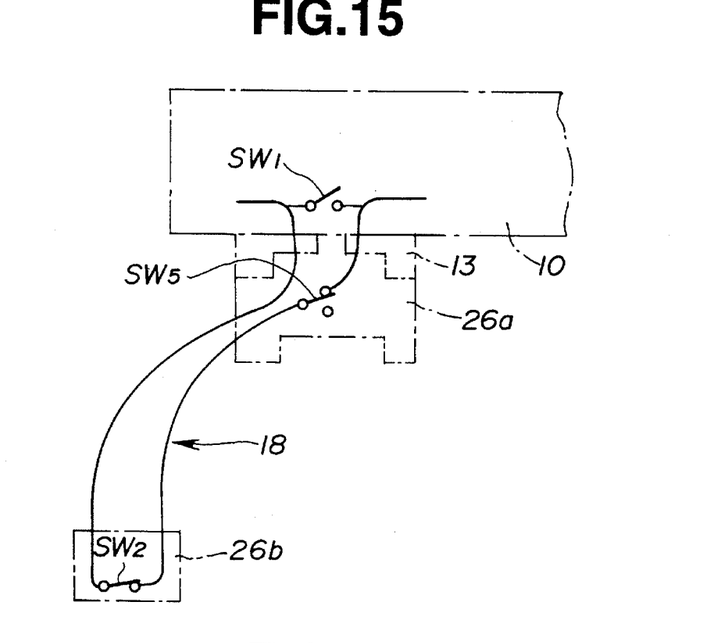
FIG. 15 is a diagram of a fifth embodiment, of an AV bus connection of the invention.

FIGS. 13, 14, 15 and 16 show a fifth embodiment of the AV system of the invention. According to this embodiment, as seen in FIG. 13, a raised portion 27 is provided on a first plug 26a which connects to the AV control center 10. A recessed portion 28 corresponds reciprocally to the arrangement of the raised portion, which has terminals t3, t3 . . . arranged on side surfaces thereof, as shown in FIG. 14. The projecting portion is provided on the raised portion 27 for enabling/disabling the switch group SW1, the AV bus cable 18 has a second plug 26b for connection to an image source component 11 as described above and sown in FIG. 15.

Figure 16:
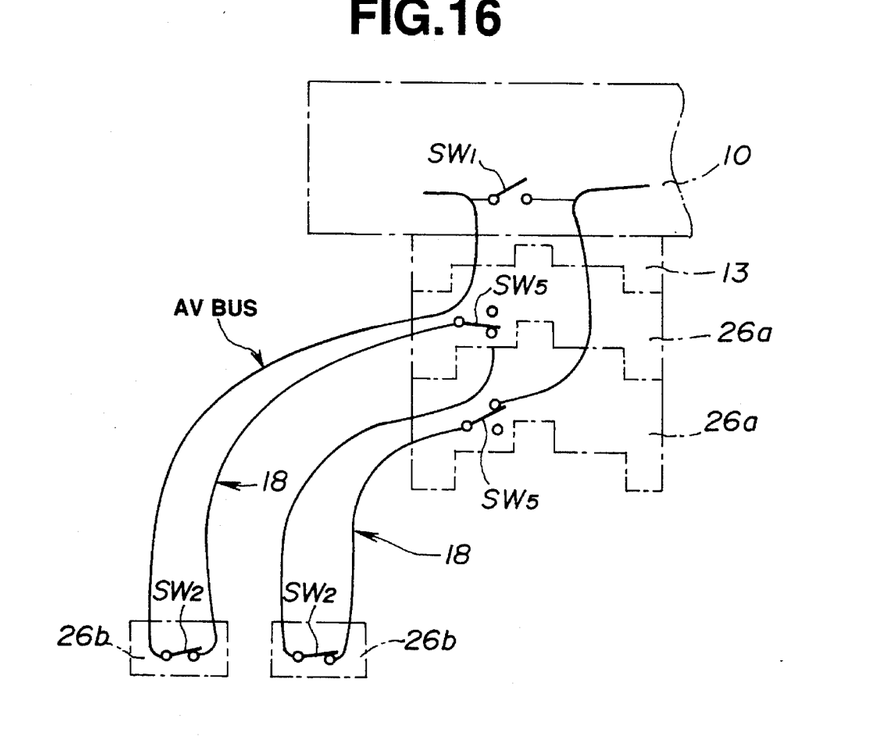
FIG. 16 is a schematic view of a fifth embodiment of circuit connections of the AV bus of the invention.

According to this, the first plugs of a plurality of AV bus cables 18 may be stacked to obtain a plurality of AV bus connections via a single connector, as shown in FIG. 16. Thus the number of parts for the AV control center 10 may be reduced and a plurality of connections may utilize a common ground line. Also, a user may decide how many bus connections are required according to individual requirements and may add more as necessary. Thus convenience and simplicity are enhanced and basic costs may be reduced.

It will be noted that although, according to the above descriptions, the AV control center 10 is connected to image source components 11a, 11b and 11c, the components 11 are not restricted only to image or video components but may also apply to cable or satellite audio signals, or other types of input.

While the present invention has been disclosed in terms of preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An audio-visual system, comprising:

an audio-visual system control component including at least one control connector, said control connector including an input terminal group and an output terminal group;

an AV bus cable;

switching means provided between said input terminal group and said output terminal group and operable so as to close an audio-visual bus circuit of said audio-visual system in response to detachment of a plug of said AV bus cable from said control connector and to open said audio-visual bus circuit of said audio-visual system in response to attachment of the plug of said AV bus cable to said control connector;

said AV bus cable including input side and output side plugs interconnected via a bus line, each of said input side plugs being receivable by said control connector and a corresponding one of said input side plugs being receivable by an image source connector provided on an image source component of said audio-visual system to be connected to said control component.

2. An audio-visual system as set forth in claim 1, wherein said AV bus cable includes separate bus signal transmission lines and audio signal transmission lines commonly sheathed therein.

3. An audio-visual system as set forth in claim 1, wherein image sigals between said control component and said image source component are transmitted via an image signal cable separate from said AV bus cable.

4. An audio-visual system as set forth in claim 1, wherein said AV bus cable includes separate bus signal transmission lines and audio-visual signal transmission lines commonly sheathed therein.

5. An audio-visual system as set forth in claim 1, wherein said AV bus cable further includes a switch group operable such that output and input sides of said AV bus cable are connected when a corresponding input side plug is not connected to an image source component.

6. An audio-visual system as set forth in claim 1 further including connection detector means operable such that when the corresponding one of said input side plugs of said AV bus cable is connected to said image source component, said detector means activates and outputs an on screen display image for indicating a present connective state of said audio-visual system.

7. An audio-visual system as set forth in claim 1, wherein the corresponding one of said input side plugs of said AV bus cable is permanently connected to said image source component in a non-releasable manner.

8. An audio-visual system as set forth in claim 1, wherein said AV bus cable comprises a first AV bus cable and further comprising a second AV bus cable connected to the corresponding one of said input side plugs of said first AV bus cable, said first and second AV bus cables further including switching means operable such that output and input sides of said second AV bus cable provide a second AV bus operable within said audio-visual system.

9. An audio-visual system as set forth in claim 1, wherein said control component includes a plurality of control connectors connected to image source connectors of a plurality of image source components of said audio-visual system via a corresponding number of respective AV bus cables.

* * * * *